United States Patent [19]

Henze et al.

[11] 3,974,589
[45] Aug. 17, 1976

[54] FISHING LINE RETENTION DEVICE

[75] Inventors: Walter J. Henze; San Thein, both of Philadelphia, Pa.

[73] Assignee: Penn Fishing Tackle Mfg. Co., Philadelphia, Pa.

[22] Filed: Mar. 28, 1975

[21] Appl. No.: 563,065

[52] U.S. Cl. .............................. 43/43.12; 24/115 F; 24/201 TR; 24/230 AL
[51] Int. Cl.² ........................................ A01K 95/00
[58] Field of Search ................. 43/43.12; 24/115 F, 24/201 TR, 230 AL, 230 AN, 244

[56] References Cited
UNITED STATES PATENTS

| | | |
|---|---|---|
| 2,749,649 | 6/1956 | Fitzsimmons ..................... 43/43.12 |
| 3,704,633 | 12/1972 | Iverson .......................... 24/230 AL |
| 3,778,918 | 12/1973 | Emory, Sr. et al ................. 43/43.12 |

*Primary Examiner*—Louis G. Mancene
*Assistant Examiner*—Daniel J. Leach
*Attorney, Agent, or Firm*—Zachary T. Wobensmith, 2nd; Zachary T. Wobensmith, III

[57] ABSTRACT

A fishing line retention device for use with a trolling apparatus which detachably retains the line to the weight carried by the trolling apparatus but permits quick detachment therefrom upon a fish strike. The device includes a body attached to an arm extending from a weight with the body detachably retaining a light-weight tongue in a slot, the tongue and the fishing line being in slidable relation.

6 Claims, 4 Drawing Figures

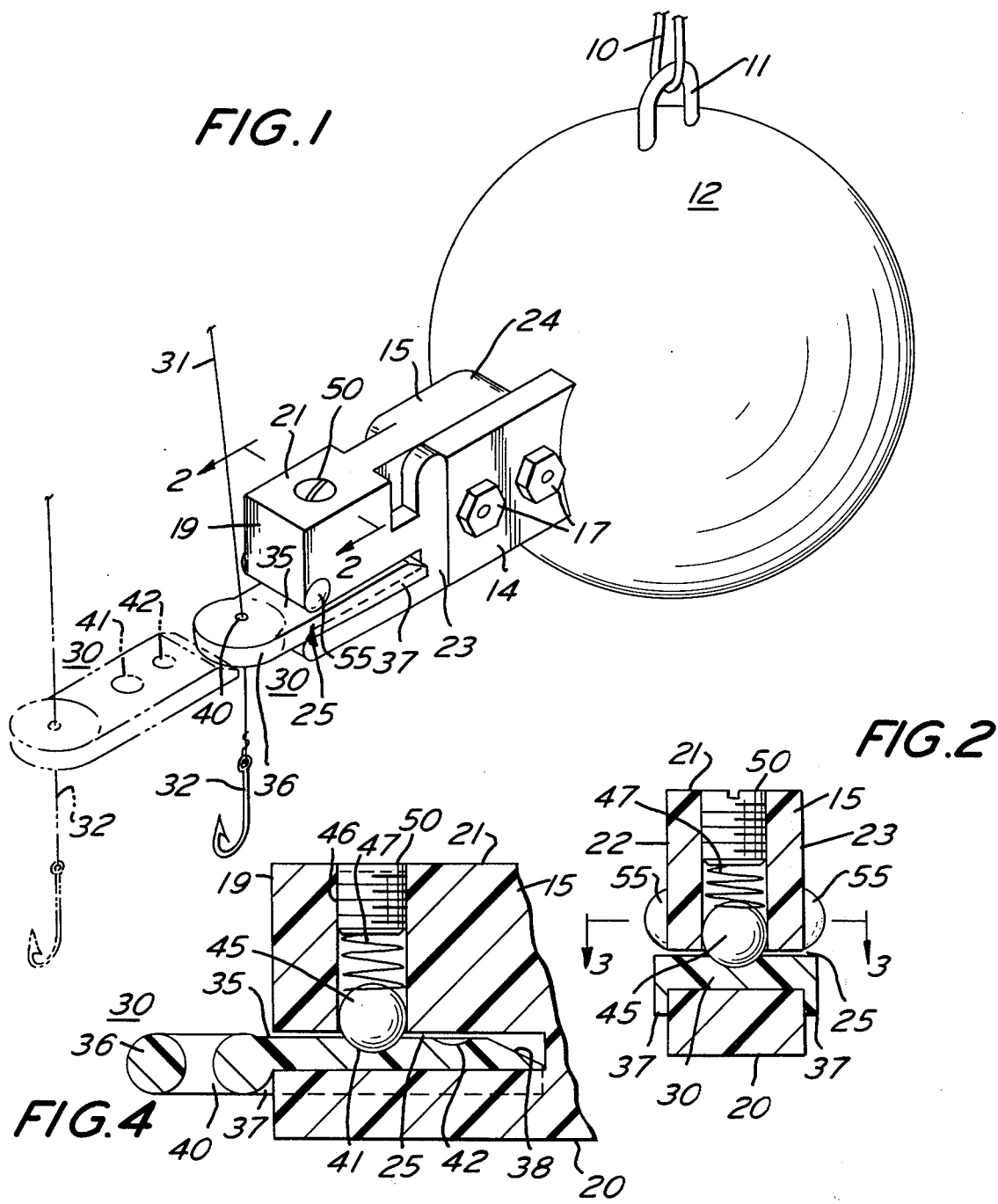

FISHING LINE RETENTION DEVICE

BACKGROUND OF THE INVENTION

1. Field of the Invention

This invention relates to a fishing line retention device of the type wherein a portion of the device remains on the fishing line upon detachment from the weight carried by the trolling apparatus.

2. Description of the Prior Art

When using trolling apparatus for fishing it is necessary to provide a device for attaching the fishing line to the weight carried by the trolling apparatus but which line may be easily detached when a fish strikes.

Many devices have been proposed for line retention which often are of the clothespin or spring operated type or comprise a structure which includes two smooth discs forced together by springs fastened to the weight and with the line carried therebetween, but none of the devices available have proven wholly satisfactory in use. Most of the devices do not permit easy detachment of the fishing line, can injure the line, or result in entanglement of the fishing line with the line from the trolling apparatus.

The device of our invention fastens directly to the weight carried by the trolling apparatus, is easily detached and reattached as desired and possesses other advantages not found in the prior art.

SUMMARY OF THE INVENTION

A fishing line retention device is provided which includes a body attached to the weight from a trolling apparatus, the body having a light weight tongue detachably carried therein through which tongue the fishing line slidably extends and which tongue is retained in the body until a fish strikes the fishing line.

The principal object of the invention is to provide a fishing line retention device that provides positive control of the attachment of the fishing line to the weight from a trolling apparatus.

A further object of the invention is to provide a fishing line retention device that provides positive control of the fishing line attachment to the weight from a trolling apparatus.

A further object of the invention is to provide a fishing line retention device for trolling that can be used with a variety of sizes of fishing line without modification.

A further object of the invention is to provide a fishing line retention device for trolling that can be quickly and easily detached and reattached to the weight from the trolling apparatus.

A further object of the invention is to provide a fishing line retention device which cannot be installed in other than the correct position.

A further object of the invention is to provide a fishing line retention device for trolling that is simple and inexpensive to construct but sturdy and reliable in operation.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof, in which:

FIG. 1 is a view in perspective illustrating the device of the invention attached for use and also showing in phantom a portion of the device in detached condition;

FIG. 2 is a vertical sectional view, enlarged, taken approximately on the line 2—2 of FIG. 1, FIG. 3 is a horizontal sectional view taken approximately on the line 3—3 of FIG. 2, and FIG. 4 is a fragmentary vertical sectional view taken approximately on the line 4—4 of FIG. 3.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings a trolling weight control line 10 is shown which extends to a reel (not shown) of the trolling apparatus. The line 10 is attached to a ring 11 of a weight 12 preferably of spherical configuration which is preferably composed of lead with an anti-corrosive coating thereon of well known type.

The weight 12 has an arm 14 integral therewith embedded or molded therein and extending therefrom to which a body 15 of the device is attached by screws 16 and nuts 17. The body 15 is of generally rectangular shape with a cut out portion 18 which receives the arm 14 and is preferably constructed of nylon.

The body 15 has a front wall 19, bottom wall 20, top wall 21, side walls 22 and 23, and a rounded rear wall 24. The body 15 at front wall 19 has a slot 25 which extends horizontally approximately one half its length and transversely from side wall 22 to side wall 23.

The slot 25 receives a tongue 30 which is carried on a hook and bait carrying fishing line 31. The tongue 30 is of rectangular configuration with top wall 35, front end portion 36, rims 37 extending perpendicularly from top wall 35 as seen in FIGS. 1 and 2 and a sloping rear portion 38.

The line 31 extends through a hole 40 in the front end 36 which hole is large enough to accommodate the largest diameter line expected to be used and has a bait or lure carrying hook 32 of conventional type at its end.

The front end 36 of tongue 30 is rounded so as to preclude any damage to the line and reduce the chances of entanglement.

The top wall 35 has two recesses 41 and 42 therein with recess 41 being deeper than recess 42.

The recesses 41 and 42 can receive a ball 45 which is carried in a bore 46 in the body 15 and urged downwardly by a spring 47 which bears against the ball 45 and against a set screw 50 in threaded engagement in the bore 46.

The ball 45 is preferably constructed of stainless steel, the spring 47 is also preferably constructed of stainless steel and the set screw 50 is preferably formed of nylon.

The rims 37 which in the attached position extend over a portion of the side walls 22 and 23 cannot be installed in a position where the recesses 41 and 42 are other than available to receive the steel ball 45 since the side walls 22 and 23 are each provided with rounded projections or stops 55 just above the slot 25 which prevent insertion of the tongue 30 into slot 25 with rims 37 upturned.

In use the tongue 30 has the line 10 threaded through hole 40 and the tongue 30 is inserted into slot 35 until the ball 45 engages in one of the recesses 41 or 42. The weight 12 is then placed in the water and trolling for fish commenced. When a fish strikes the hook 32 the tongue 30 is pulled out of slot 25 and the fish can be played independently of the trolling apparatus and removed from hook 32. The tongue 30 can then be reattached and trolling resumed.

It will thus be seen that apparatus has been provided with which the objects of the invention are attained.

We claim:

1. A fishing line retention device for attachment to a weight carried by a line from a trolling apparatus and for attachment to a fishing line which comprises
   a one piece body secured to said weight,
   a tongue detachably carried by said body having a hole beyond said body through which said fishing line is slidably disposed,
   said tongue being rectangular in transverse cross section and having an upper face,
   said body having a complemental horizontal slot into which said tongue extends,
   said tongue having an upper face with a recess therein, and
   said body having a spring loaded member engageable in said recess in tongue retaining position.

2. A fishing line retention device as defined in claim 1 in which
   said tongue is of synthetic plastic.

3. A fishing line retention device as defined in claim 1 in which
   said body is of synthetic plastic.

4. A fishing line retention device for attachment to a weight carried by a line from a trolling apparatus and for attachment to a fishing line which comprises
   a body secured to said weight,
   a tongue detachably carried by said body having a hole beyond said body through which said fishing line is slidably disposed,
   said tongue being provided with a plurality of recesses of different depths for controlled retention of said tongue,
   said body having a spring loaded member engageable in one of said recesses in tongue retaining position.

5. A fishing line retention device for attachment to a weight carried by a line from a trolling apparatus and for attachment to a fishing line which comprises
   a body secured to said weight,
   a tongue detachably carried by said body and having a hole beyond said body through which said fishing line is slidably disposed,
   said body having a slot in which said tongue is carried,
   said tongue being provided with rims which extend over a portion of said body, and
   said body being provided with a stop member which restricts the disposition of said rims.

6. A fishing line retention device as defined in claim 1 in which
   the upper face of said tongue has a sloping end portion to facilitate the insertion of said tongue past said spring loaded member into said body.

* * * * *